(12) United States Patent
Jägenstedt et al.

(10) Patent No.: US 9,713,303 B2
(45) Date of Patent: Jul. 25, 2017

(54) ROBOTIC WORKING TOOL

(71) Applicant: HUSQVARNA AB, Huskvarna (SE)

(72) Inventors: Patrik Jägenstedt, Tenhult (SE);
Mattias Kamfors, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/769,470

(22) PCT Filed: Feb. 21, 2013

(86) PCT No.: PCT/SE2013/050153
§ 371 (c)(1),
(2) Date: Aug. 21, 2015

(87) PCT Pub. No.: WO2014/129944
PCT Pub. Date: Aug. 28, 2014

(65) Prior Publication Data
US 2015/0373906 A1     Dec. 31, 2015

(51) Int. Cl.
*G01C 22/00* (2006.01)
*G05D 1/00* (2006.01)
(Continued)

(52) U.S. Cl.
CPC ............ *A01D 34/008* (2013.01); *B60L 1/003* (2013.01); *B60L 3/0061* (2013.01); *B60L 8/003* (2013.01);
(Continued)

(58) Field of Classification Search
CPC . Y02T 10/72; Y02T 10/7072; Y02T 10/7005; Y02T 90/14; Y02T 10/7083;
(Continued)

(56) References Cited

U.S. PATENT DOCUMENTS 5,281,901 A * 1/1994 Yardley ................ G05D 1/0265
180/167
5,650,703 A * 7/1997 Yardley ................ G05D 1/0265
180/167
(Continued)

FOREIGN PATENT DOCUMENTS

EP     1906205 A1     4/2008
EP     2502482 A1     9/2012
(Continued)

OTHER PUBLICATIONS

International Search Report & Written Opinion mailed Jan. 17, 2014 in International Patent Application No. PCT/SE2013/050153.
(Continued)

*Primary Examiner* — Jaime Figueroa
(74) *Attorney, Agent, or Firm* — McNair Law Firm, P.A.

(57) ABSTRACT

Disclosed is a robotic work tool (100) for use with at least one guiding wire (250; 260) adapted to conduct electric current to generate a magnetic field around the guiding wire. The robotic work tool has a sensing system (510) adapted to detect a strength of the magnetic field, a steering system (540), a controller (530) configured to control the steering system in response to output from the sensing system by means of a feedback control loop (532) so as to cause movement of the robotic work tool along the guiding wire. The controller is configured to determine a measure indicative of a distance between the robotic work tool and the guiding wire, and adjust at least one parameter of the feedback control loop in response to the determined distance measure.

20 Claims, 4 Drawing Sheets

(51) Int. Cl.
*A01D 34/00* (2006.01)
*B60L 1/00* (2006.01)
*B60L 3/00* (2006.01)
*B60L 8/00* (2006.01)
*B60L 11/18* (2006.01)
*B60L 15/20* (2006.01)
*G05D 1/02* (2006.01)

(52) U.S. Cl.
CPC ....... *B60L 11/1805* (2013.01); *B60L 11/1818* (2013.01); *B60L 11/1877* (2013.01); *B60L 15/20* (2013.01); *G05D 1/0259* (2013.01); *G05D 1/0265* (2013.01); *B60L 2200/40* (2013.01); *B60L 2240/36* (2013.01); *B60L 2240/421* (2013.01); *B60L 2260/32* (2013.01); *G05D 1/0225* (2013.01); *G05D 2201/0208* (2013.01); *G05D 2201/0215* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/72* (2013.01); *Y02T 10/7275* (2013.01); *Y02T 90/14* (2013.01); *Y10S 901/01* (2013.01)

(58) Field of Classification Search
CPC . Y02T 10/705; Y02T 10/7275; Y02T 10/645; G05D 1/0259; G05D 1/0265; G05D 2201/0208; A01D 34/008; Y10S 901/01; B60L 1/003; B60L 2240/421; B60L 11/1805; B60L 2240/36; B60L 3/0061; B60L 11/1818; B60L 15/20; B60L 11/1877; B60L 2200/40; B60L 2260/32; B60L 8/003
USPC .............................................. 700/701; 701/24
See application file for complete search history.

(56) References Cited

U.S. PATENT DOCUMENTS

| | | | | |
|---|---|---|---|---|
| 8,942,862 B2* | 1/2015 | Markusson | .......... | A01D 34/008 700/245 |
| 9,026,299 B2* | 5/2015 | Johnson | ............... | G05D 1/0219 356/138 |
| 9,072,218 B2* | 7/2015 | Johnson | ............... | A01D 34/008 |
| 9,072,219 B2* | 7/2015 | Da Rocha | ............ | A01D 34/008 |
| 9,119,341 B2* | 9/2015 | Jagenstedt | ........... | A01D 34/008 |
| 9,405,294 B2* | 8/2016 | Jagenstedt | ........... | A01D 34/008 |
| 2012/0029754 A1 | 2/2012 | Thompson et al. | | |
| 2013/0030609 A1* | 1/2013 | Jagenstedt | ........... | A01D 34/008 701/2 |
| 2013/0066484 A1* | 3/2013 | Markusson | .......... | A01D 34/008 701/2 |
| 2013/0184924 A1* | 7/2013 | Jagenstedt | ........... | A01D 34/008 701/23 |
| 2013/0199144 A1* | 8/2013 | Bernini | ................ | A01D 34/008 56/10.2 A |
| 2013/0211646 A1* | 8/2013 | Yamamura | ........... | G05D 1/0225 701/22 |
| 2014/0012418 A1* | 1/2014 | Johnson | ............... | A01D 34/008 700/258 |
| 2014/0012453 A1* | 1/2014 | Johnson | ............... | G05D 1/0219 701/23 |
| 2014/0379196 A1* | 12/2014 | Da Rocha | ............ | A01D 34/008 701/26 |

FOREIGN PATENT DOCUMENTS

| | | |
|---|---|---|
| EP | 2625946 A1 | 8/2013 |
| EP | 2626760 A2 | 8/2013 |
| WO | 2011115535 A1 | 9/2011 |
| WO | 2011129728 A1 | 10/2011 |
| WO | 2012044220 A1 | 4/2012 |
| WO | 2014129944 A1 | 8/2014 |

OTHER PUBLICATIONS

International Preliminary Report on Patentability issued Aug. 25, 2015 in International Patent Application No. PCT/SE2013/050153.

* cited by examiner

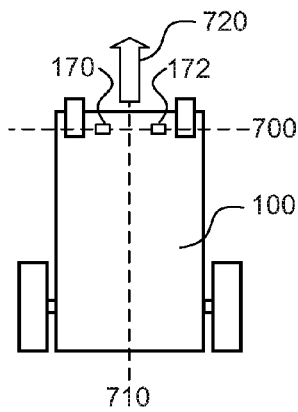 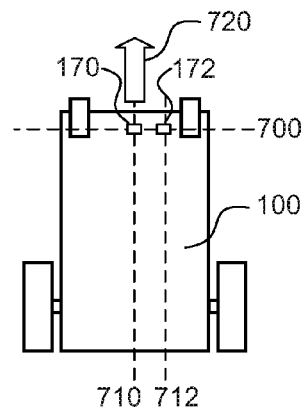 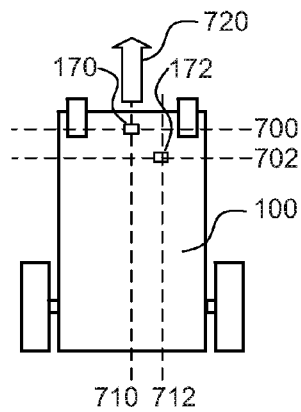
Fig. 7A    Fig. 7B    Fig. 7C
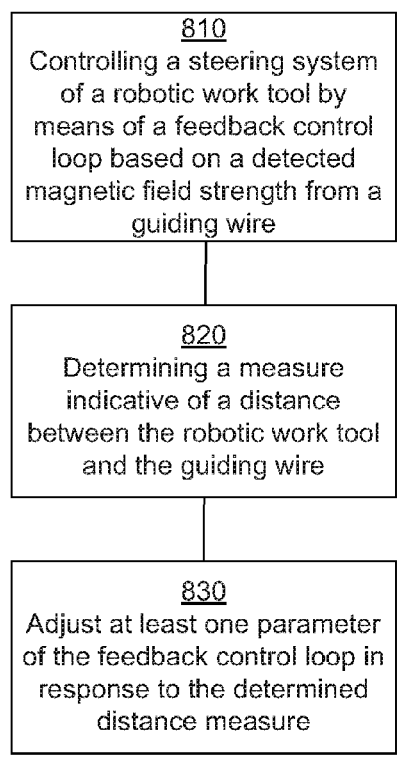
Fig. 8

ROBOTIC WORKING TOOL

TECHNICAL FIELD

This application generally relates to robotic work tools and the control thereof, and in particular to a robotic work tool, and a method of controlling such a robotic work tool, with improved ability to follow along a guiding wire.

BACKGROUND

Robotic work tools are available on the market in different types. One common type is a robotic lawnmower, other types include robotic vacuum cleaners, robotic floor cleaners, robotic snow removers and robotic garbage collectors. A robotic lawnmower will be used as a non-limiting example of a robotic work tool in this document; a skilled person will however realise that the teachings in this document are applicable also to other types of robotic work tools.

Robotic lawnmowers are extensively used for lawn maintenance activities. Typically, a robotic lawnmower is an autonomous robotic tool which uses an onboard battery as a power source. Based on the operating load and duration, there is a need to recharge the battery of the robotic lawnmower periodically. Since an autonomous robotic lawnmower works unattended, it is required to find a path to a charging station in case the battery power level falls below a threshold power level during operation. There are many techniques which are currently used to guide the robotic lawnmower back to the charging station. For instance, an antenna built on the charging station may be used to navigate the robotic lawnmower to the charging station. However, the antenna may have a limited range in a vicinity of the charging station, and there is a risk that the robotic lawnmower will have difficulties in finding the charging station before the remaining battery power runs out.

Therefore, many robotic lawnmowers are configured to follow a guiding wire that may be used to navigate the robotic lawnmower to the charging station. The guiding wire may be a boundary wire which demarcates, i.e. delimits the perimeter of, an intended work area of the robotic lawnmower. Alternatively or additionally, a shorter straight guide wire or wire loop may be provided in front of the entrance to the charging station, serving to assist the robotic lawnmower to safely approach and dock with the charging station. Both a boundary wire and an entrance guide wire may, in a non-limiting manner, constitute a "guiding wire" for embodiments disclosed in this document.

In order to be able to follow the guiding wire, the robotic lawnmower is provided with one or more sensors adapted to sense the intensity or strength of a magnetic field generated by the guiding wire. The sensor(s) may for instance be vertical loop sensor(s). However, if the robotic lawnmower would follow the same path each time, it could result in undesirable permanent visible tracks and/or markings on the lawn. To overcome the above mentioned disadvantages, robotic lawnmowers may be configured to follow along the guiding wire at a distance. This distance may be selected for instance randomly each time the robotic lawnmower navigates to the charging station. The robotic lawnmower follows fixed magnetic field intensity while traveling back to the charging station. The fixed magnetic field intensity is selected to have a different value from one cycle to another. Thus, the robotic lawnmower takes a different path each time it travels to the charging station. This approach effectively addresses the problem of visible tracks on the lawn.

Generally, longer distances to the guiding wire will yield lower values of strength of the magnetic field detected by the sensor(s). The relation between detected magnetic field strength (i.e. the value of the sensor output signal) and distance to the guiding wire allows the robotic lawnmover to follow along the wire at the desired distance. However, the present inventor has realised certain complications and problems with the typical behavior of the sensor output signal. An exemplifying illustration of the sensor output signal is given in FIG. 4A.

First, the relation is non-linear. Second, the sensor output signal varies more heavily with distance for shorter distances to the guiding wire. Third, the sensor output signal even changes in the opposite direction when the distance to the guiding wire is very short, exhibiting even stronger variations also for very small differences in distance. Fourth, the sensor output signal becomes zero when the robotic work crosses the guiding wire, and then assumes opposite polarity at the other side of the guiding wire.

Because of these complications, prior art robotic lawnmovers have shortcomings in their ability to follow a guiding wire at a broad range of different distances, including distances very close to the guiding wire, and/or distances at both sides of the guiding wire. Many prior art robotic work tools also have short comings when following a guiding wire through a corner. Thus there is a need for improvements in these regards.

SUMMARY

It is an object of the teachings of this application to overcome the problems listed above by providing a robotic work tool for use with at least one guiding wire adapted to conduct electric current to generate a magnetic field around the guiding wire. The robotic work tool comprising a sensing system adapted to detect a strength of the magnetic field, a steering system, and a controller configured to control said steering system in response to output from said sensing system by means of a feedback control loop so as to cause movement of said robotic work tool along said guiding wire. The controller is configured to determine a measure indicative of a distance between the robotic work tool and the guiding wire; and adjust at least one parameter of the feedback control loop in response to the determined distance measure.

In one embodiment the robotic work tool is part of a robotic work tool system which furthermore comprises a charging station, a guiding wire, and a signal generator for generating and transmitting an electric signal through said guiding wire.

In one embodiment the robotic work tool is a robotic lawnmower,

It is also an object of the teachings of this application to overcome the problems listed above by providing a method of controlling a robotic work tool to follow along a guiding wire adapted to conduct electric current and generate a magnetic field around the guiding wire. The method comprises controlling a steering system of the robotic work tool by means of a feedback control loop based on a detected magnetic field strength. The method also comprises determining a measure indicative of a distance between the robotic work tool and the guiding wire. The method furthermore also comprises adjusting at least one parameter of the feedback control loop in response to the determined distance measure.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

Embodiments will now be described in further detail with reference to the accompanying drawings.

FIG. 7A schematically illustrates the location of first and second magnetic field sensors on the robotic lawnmower according to one embodiment.

FIG. 7B schematically illustrates the location of first and second magnetic field sensors on the robotic lawnmower according to another embodiment.

FIG. 7C schematically illustrates the location of first and second magnetic field sensors on the robotic lawnmower according to still another embodiment.

FIG. 8 shows a flowchart for a method according to one embodiment of the teachings of this application.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
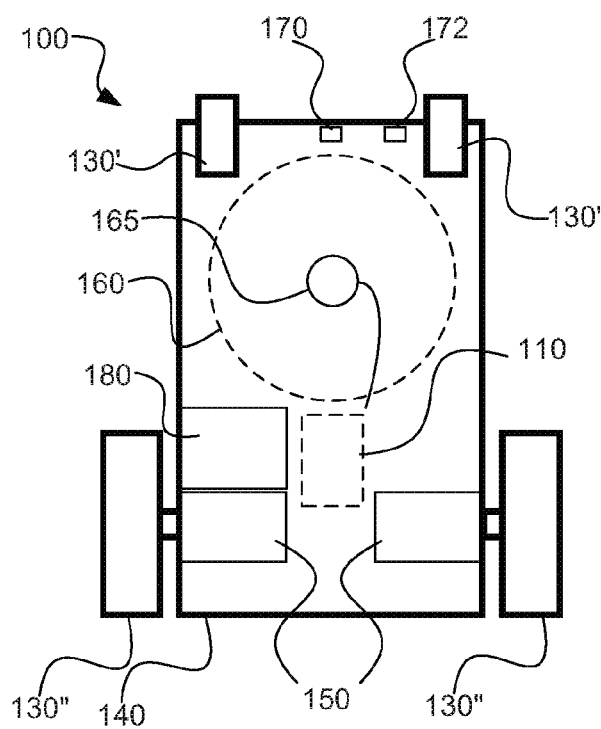
FIG. 1 shows a schematic overview of a robotic work tool according to one embodiment of the teachings of this application, in the form of a robotic lawnmower.

FIG. 1 shows a schematic overview of a robotic work tool 100 having a body 140 and a plurality of wheels 130. In the exemplary embodiment of FIG. 1 the robotic work tool 100 has four wheels 130: two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to a respective electric motor 150. This allows for driving the rear wheels 130" independently of one another which, for example, enables turning.

Figure 3:
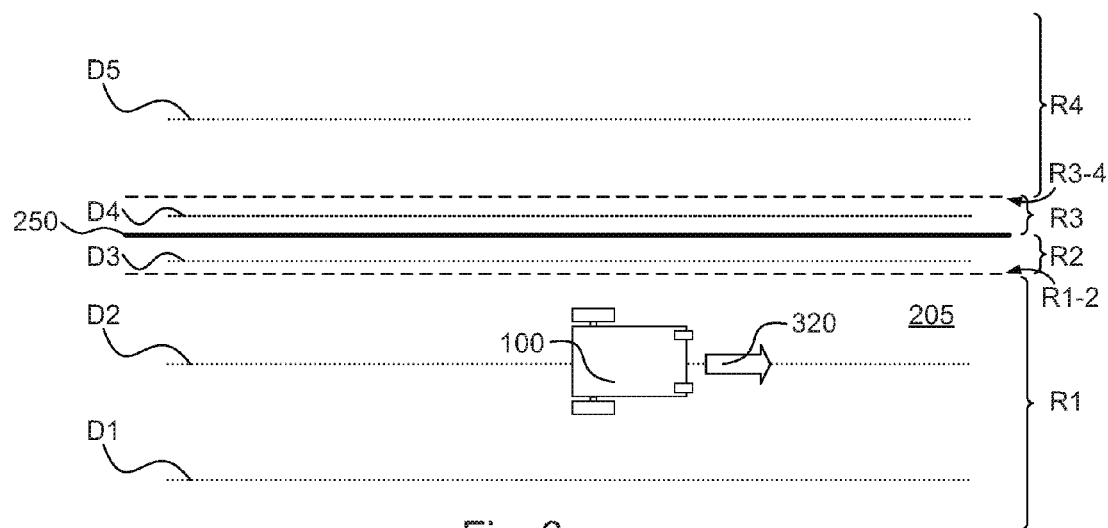
FIG. 3 schematically illustrates the robotic lawnmower when moving along a guiding wire at an arbitrary distance in one of a plurality of different distant ranges at both sides of the guiding wire.
Figure 5:
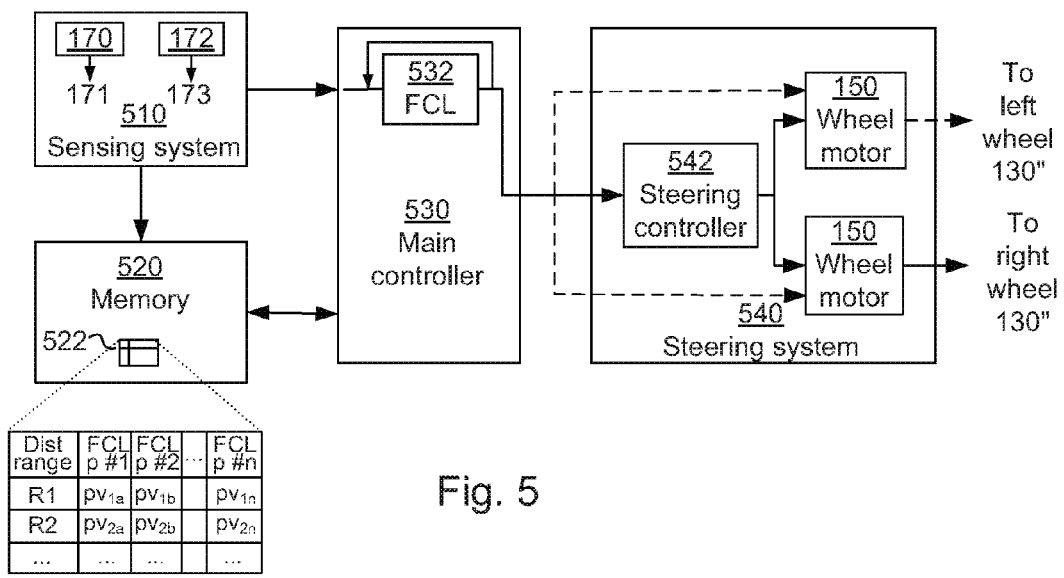
FIG. 5 is a schematic block diagram of a guiding control system of the robotic lawnmower.

The robotic work tool 100 comprises a guiding control system 110, which is illustrated in more detail as 500 in FIG. 5 and which serves to control the robotic work tool 100 to follow along a guiding wire 250 at a given distance D1-D5, as seen in FIG. 3. As seen in FIG. 5, the main parts of the guiding control system 110/500 is a sensing system 510, a memory 520, a controller 530 and a steering system 540.

The sensing system 510 comprises one or more magnetic field sensors 170, 172. If more than one sensor is used, as is the case in the disclosed embodiments, the second magnetic field sensor 172 will be positioned at an offset with respect to the first sensor 170. FIGS. 7A-7C illustrates advantageous locations of the first and second magnetic field sensors 170, 172 according to different embodiments. The magnetic field sensors 170, 172 may, for instance, be vertical loop sensors. They produce respective sensor output signals 171, 173, caused by a magnetic field being generated by an electric current in the form of a control signal being transmitted through the guiding wire 250 (for more details on charging stations, control signals and guiding wires, see the description below with reference to FIG. 2). This enables the guiding control system 110 to determine the distance between the robotic work tool 100 and the guiding wire, and also whether the robotic work tool 100 is inside or outside an area demarcated by the guiding wire.

The steering system 540 comprises the wheel motors 150 and, optionally, a steering controller 542.

The controller 530 is configured to control the steering system 540 (either through the steering controller 542 or directly via the wheel motors 150) in response to output from the sensor system by means of a feedback control loop 532 so as to cause movement of the robotic work tool along the guiding wire 250. En embodiment of the feedback control loop 532 is shown as 600 in FIG. 6. The guiding control system 110 may cause propulsion of the robotic work tool 100 in a forward direction 320 (FIG. 3) in parallel to the guiding wire 250 by controlling the steering system 540 to cause driving of the rear wheels 130" at essentially the same speed through the left and right wheel motors 150. The guiding control system 110 may also adjust the lateral distance of the robotic work tool 100 to the guiding wire by controlling the steering system 540 to cause differential driving of the rear wheels 130" through the left and right wheel motors 150. The guiding control system 110 may also serve other purposes which are not central to the teachings of the present application, such as controlling the operation/movements of the robotic work tool 100 in a service area confined by a boundary wire, which may be the same as the guiding wire or a different wire.

Referring back to FIG. 1, the robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a robotic lawnmower.

The robotic work tool 100 also has (at least) one battery 180 for providing power to the motors 150 and the cutter motor 165.

Figure 2:
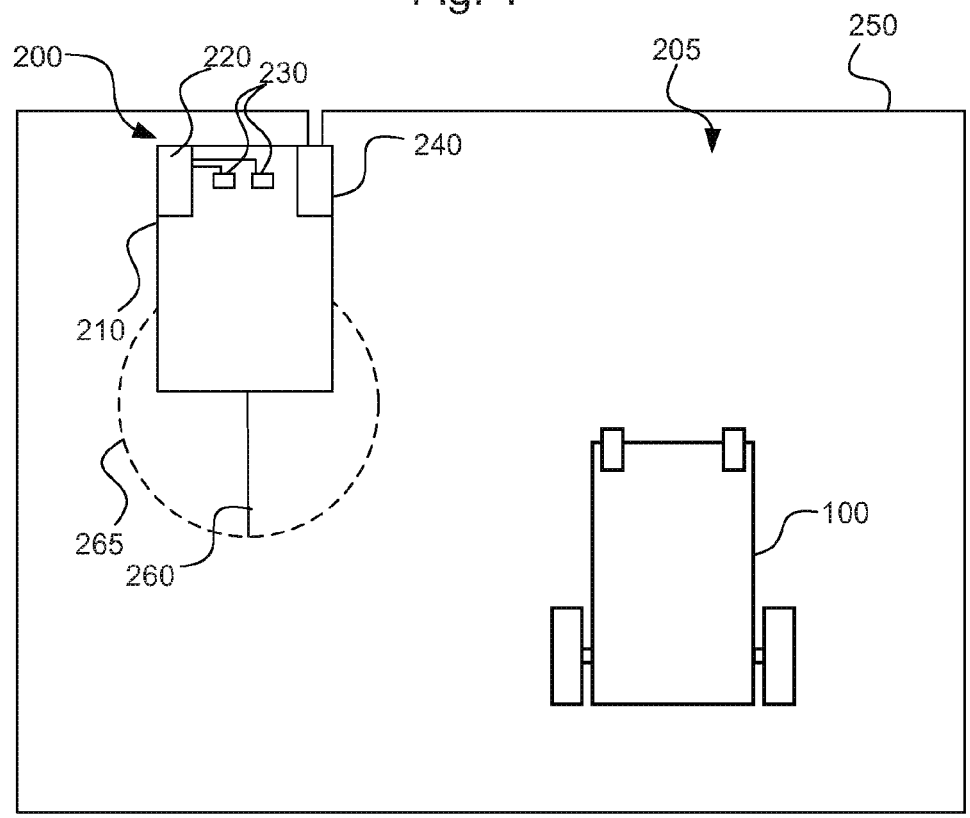
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170 or 172) crosses the boundary wire 250 the direction of the magnetic field will change. The robotic work tool 100 will thereby be able to determine that the boundary wire has been crossed. The use of more than one sensor 170, 172 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has an entrance guide wire 260 for enabling the robotic work tool to find the entrance of the charging station 210. In one embodiment the entrance guide wire 260 may be formed by a loop of the boundary wire 250, in another embodiment it may be a short straight wire. For the rest of this disclosure, the term "guiding wire 250" will be used to jointly represent any of the boundary wire 250 or entrance guide wire 260, with no special priority between the two.

Improved ability for the robotic work tool 100 to follow the guiding wire 250 at a broad range of different distances, including distances very close to the guiding wire, and/or distances at both sides of the guiding wire, will now be described. From a general point of view, the improvement is illustrated in FIG. 8. As already mentioned, the steering system 540 of the robotic work tool 100 is controlled 810 through use of the feedback control loop 532 based on a detected magnetic field strength from the sensing system 510. A measure indicative of a distance between the robotic work tool 100 and the guiding wire 250 is determined 820. At least one parameter of the feedback control loop 532 is adjusted 830 in response to the determined distance measure.

In one embodiment, the distance measure is determined as a particular distance range, in a set of distance ranges R1, R2, R1-2, R3, R4, R3-4, in which particular distance range the estimated distance between the robotic work tool 100 and the guiding wire 250 falls. Such a set of distance ranges is shown in FIG. 3.

Further as shown in FIG. 3, the memory 520 may be configured to store a set 522 of predefined feedback control loop parameter values for respective distance ranges in the set of distance ranges R1, R2, R1-2, R3, R4, R3-4. The controller 530 may be configured to use the predefined feedback control loop parameter values for the determined particular distance range when adjusting the at least one parameter of the feedback control loop 532.

When the feedback control loop 532 is a PID control loop (as is the case for the embodiment shown in FIG. 6), the predefined feedback control loop parameter values 522 will represent possible values of the proportional gain 610, the integral gain 620 and the derivative gain 630 of the PID control loop 600 for different distance ranges in the set of distance ranges. This is seen in FIG. 5 at 522, where a first set of predefined feedback control loop parameter values $pv_{1a}, pv_{1b}, \ldots, pv_{1n}$ are stored for distance range R1, whereas a second set of predefined feedback control loop parameter values $pv_{2a}, pv_{2b}, \ldots, pv_{2n}$ is stored for distance range R2, and so on.

Figure 6:
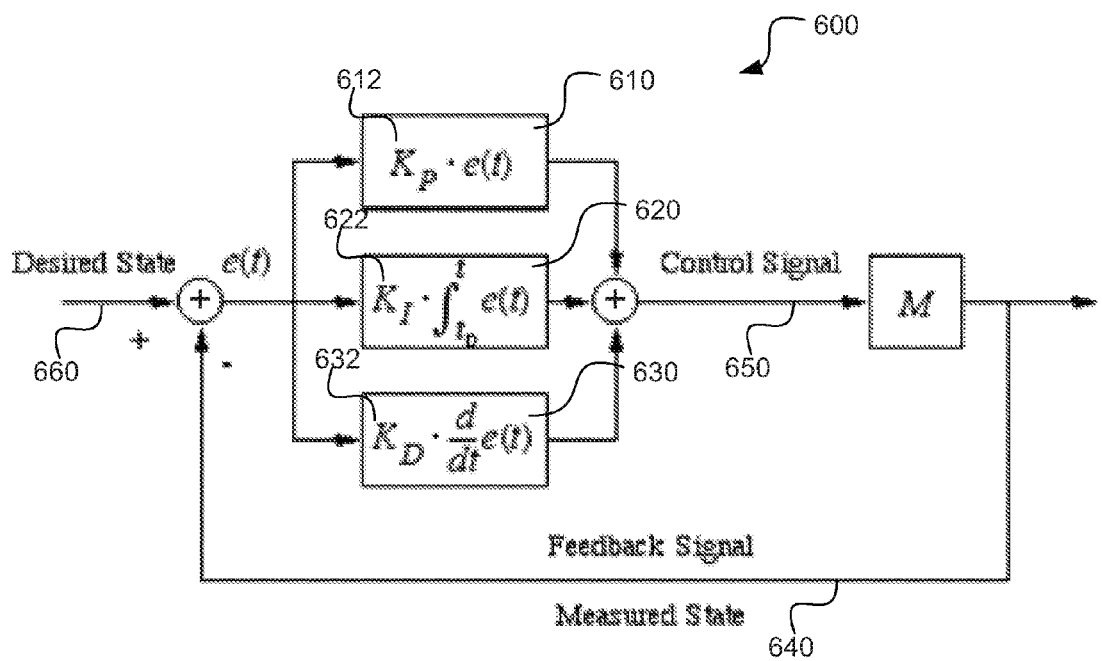
FIG. 6 is a schematic block diagram of a feedback control loop in the guiding control system.

In the disclosed embodiment of FIG. 6, the predefined feedback control loop parameter values for the present distance range will be used by the controller 530 to adjust at least one of the present proportional gain, the present integral gain and the present derivative gain of the PID control loop 600. This will typically be done by changing the value of the parameter $K_p$ 612 for the proportional gain 610, the parameter $K_I$ 622 for the integral gain 620 and/or the parameter $K_D$ 632 integral gain 620 of the derivative gain 630 to the respective predefined parameter values 522 stored in memory 520.

As seen in FIG. 3, the set of distance ranges may advantageously include a first distance range R1 representing estimated distances D1, D2 larger than a threshold distance at one side of the guiding wire 250, and a second distance range R2 representing estimated distances D3 closer than the threshold distance at said one side of the guiding wire 250. When the guiding wire 250 is a boundary wire, said one side may typically be the inside of the area 205 demarcated by the boundary wire.

Advantageously, the set of distance ranges further includes a first intermediate distance range R1-2 representing estimated distances between the first and second distance ranges at said one side of the guiding wire 250. The second distance range R2 is typically considerably narrower than the first distance range R1, and the first intermediate distance range R1-2 is typically considerably narrower than the second distance range R2. For instance, the second distance range R2 may for example represent distances between about 0 cm and about 10-20 cm between the robotic work tool and the guiding wire. The first distance range R1 may for example represent distances between about 10-20 cm and about 1-2 m between the robotic work tool and the guiding wire. The first intermediate distance range R1-2 may represent distances in a narrow range of about 1-5 cm, spanning between the upper end value of the second distance range R2 and the lower end value of the first distance range R1. It is to be noticed that the first distance range R1, the second distance range R2 and the first intermediate distance range R1-2 are preferably non-overlapping but contiguous (i.e. leaving no undefined distances between the second distance range R2 and the first intermediate distance range R1-2, nor between the first intermediate distance range R1-2 and the first distance range R1.

The provision of the first distance range R1, the second distance range R2 and the first intermediate distance range R1-2 allows for a refined tailoring of the feedback control loop 532 to compensate for the complications associated with the typical behavior of the sensor output signal 171 (or 173) from the sensing system 510. These complications were explained in the background section of this document; an exemplifying illustration of the sensor output signal is found in FIG. 4A. The respective distance ranges have been indicated in FIG. 4B; hence it can be seen that the distance ranges are advantageously selected to cover a respective portion 401-404 of the graph 400 of the sensor output signal, where the different portions exhibit mutually different characteristics.

The first distance range R1 is preferably set to cover distances a bit away from the guiding wire 250, where the sensor output signal has a rather moderate decreasing behavior. As a result, the proportional gain 610 and the integrating gain 620 (i.e. the values of the parameters $K_p$ 612 and $K_I$ 622, as given by the predefined parameter values 522) may be set to relatively high values, whereas the derivative gain 630 (i.e. the value of the parameters $K_D$ 632, as given by the predefined parameter values 522) may be set to a relatively low value. The second distance range R2 is preferably set to cover distances close to the guiding wire 250, where the sensor output signal has a rapidly changing behavior. As a result, the proportional gain 610 and the integrating gain 620 (i.e. the values of the parameters $K_p$ 612 and $K_I$ 622, as given by the predefined parameter values 522) may be set to relatively low values, whereas the derivative gain 630 (i.e. the value of the parameters $K_D$ 632, as given by the predefined parameter values 522) may be set to a relatively high value.

The first intermediate distance range R1-2 is preferably set to cover a narrow range of distances very close to where the sensor output signal reaches its top value, and will have its own predefined parameter values 522.

Hence, a more accurate control of the steering system 540 is obtained, allowing a more robust following of the guiding wire 250 by the robotic work tool 100 even at distances very close to, or even at, the guiding wire.

As seen in FIG. 3, the set of distance ranges may advantageously further include a third distance range R3 representing estimated distances D4 closer than the threshold distance at an opposite side of the guiding wire. A fourth distance range R4 representing estimated distances D5 larger than a threshold distance at said opposite side of the guiding wire 250 may also be provided, as well as a second intermediate distance range R3-4 representing estimated distances between the third and fourth distance ranges at said opposite side of the guiding wire 250.

The third distance range R3 may represent the same distances between the robotic work tool and the guiding wire as the second distance range R2, however at the opposite side of the guiding wire 250. The fourth distance range R4 may represent the same distances between the robotic work tool and the guiding wire as the first distance range R1, however at the opposite side of the guiding wire 250. The second intermediate distance range R3-4 may represent the same distances between the robotic work tool and the guiding wire as the first intermediate distance range R1-2, however at the opposite side of the guiding wire 250. The provision of the third distance range R3, the fourth distance range R4 and the second intermediate distance range R3-4 allows for a further refined tailoring of the feedback control loop and a more robust following of the guiding wire by the robotic work tool also at distances very close to, or even at, the guiding wire, and in addition at both side of the guiding wire (e.g. inside as well as outside of the boundary wire 250).

For the disclosed embodiments where the sensing system 510 comprises the first magnetic field sensor 170 and the second magnetic field sensor 172, the controller 530 may be configured to determine the distance measure in the following way. The controller 530 will read the first sensor signal value 171 from the first sensor 170. It will also read the second sensor signal value 173 from the second sensor 172, obtained simultaneously with the sensor first signal value. The controller 530 will then determine the distance measure by assessing:
1) the first sensor signal value, and
2) a relation between the first and second sensor signal values.

Figure 4A:
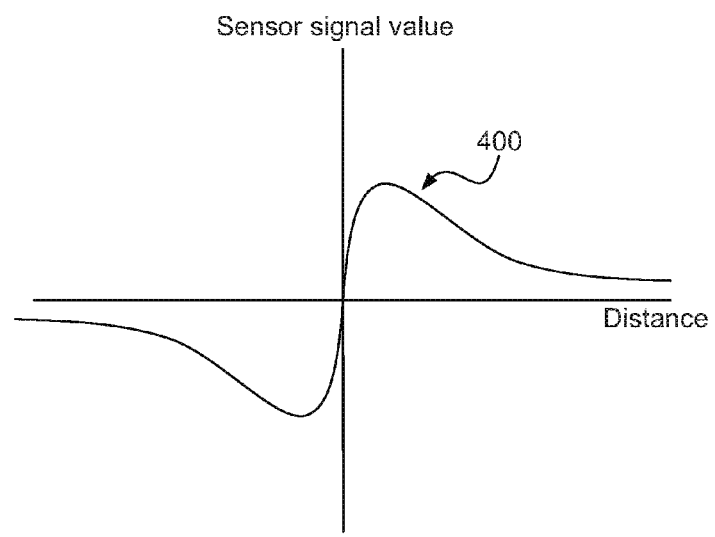
FIG. 4A is a graph schematically illustrating a typical behaviour of the output signal from of a magnetic field sensor of the robotic lawnmower as a function of the distance to the guiding wire.
Figure 4B:
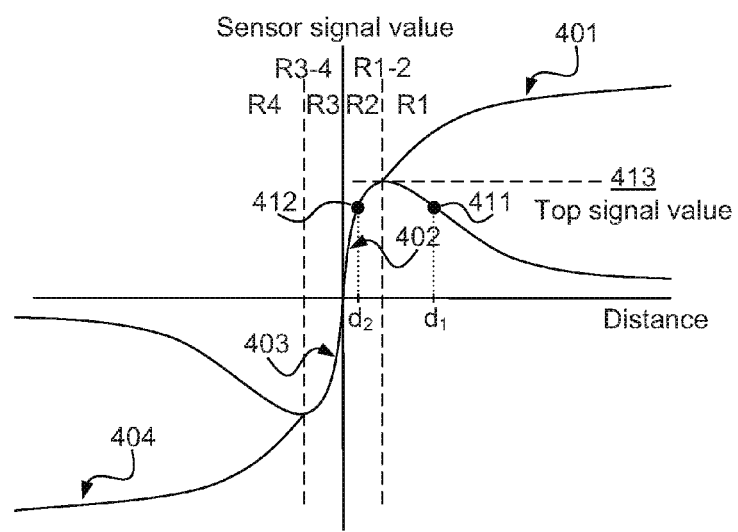
FIG. 4B is a graph similar to the one shown in FIG. 4A, serving to illustrate inventive aspects according to the teachings herein.

In more detail, as explained in FIG. 4B, determining the distance measure may involve estimating a present distance value by cross-referencing a predefined mapping between sensor signal value and distance using the first sensor signal value 171 as index. In case multiple possible present distance values $d_1$, $d_2$ are found by the cross-referencing, the relation between the first and second sensor signal values 171, 173 may be used to uniquely determine a present distance value. This will now be further explained. The predefined mapping may represent the graph 400 of the sensor signal value as a function of distance, as seen in FIG. 4A. FIG. 4B illustrates that because of the shape of the graph 400, the same sensor signal value (indicated at 411 and 412) will be read by the first sensor 170 at two different distance values $d_1$ and $d_2$. However, since the second magnetic field sensor 172 is positioned at an offset with respect to the first magnetic field sensor 170, the two sensors will not be positioned at the exact same distance from the guiding wire 250. Accordingly, there will be a slight difference in the magnetic field strength affecting the two sensors, and a corresponding difference in their sensor signals 171, 173. By examining the sign of this difference, the controller 530 may determine if the first sensor signal value 171 actually represents a distance $d_1$ or a distance $d_2$. Hence, the controller 530 may then determine the correct present distance range, R1 or R2, and select the correct predefined feedback control loop parameter values and accordingly adjust the proportional gain, integral gain and/or derivative gain of the PID control loop 532.

To facilitate the following control performed by the PID control loop 532, the controller 530 may be configured to generate a virtual sensor signal value as:
  the first sensor signal value 171, when the determined present distance value is within the second distance range (R2), or
  the first sensor signal value 171 plus the absolute value of the difference between the top signal value 413 of the first sensor signal and the first sensor signal value 171, when the determined present distance value is within the first distance range (R1).

The virtual sensor signal value will then be used as a process variable 640 in the feedback control loop 600 to generate a control signal 650 for controlling the steering system 540 (represented by the box M in FIG. 6). The set value 660, representing a desired detected magnetic field strength and therefore a desired distance to the guiding wire 250, may be set by the controller 530 in an appropriate way, such as for instance generating a random value to avoid markings in the lawn as explained in the background section of this document.

In effect, this creates a virtual sensor signal having a graph 401-404 as shown in FIG. 4B. Unlike the original sensor signal 400, the virtual sensor signal 401-404 is free of ambiguous points where the same sensor signal value would be obtained at two different distances. The top signal value 413 of the first sensor signal 171 may be determined by the controller 530 during ongoing operation by monitoring the first sensor signal 171 and detect where it reaches its maximum. This is beneficial, since this will compensate for deviations in the top value caused by environmental factors such as temperature, sensor sensitivity drift, etc.

FIGS. 7A to 7C illustrate advantageous locations of the first and second magnetic field sensors 170 and 172 on the robotic work tool 100. In FIG. 7A, the first magnetic field sensor 170 and the second magnetic field sensor 172 are placed at a front section of the robotic work tool 100, along an axis 700 transversal to a longitudinal center axis 710 of the robotic work tool's propulsion direction 720.

In FIG. 7B, the first magnetic field sensor 170 is instead placed on the longitudinal center axis 710 and the second magnetic field sensor 172 is placed at a transversal offset 712 from the longitudinal center axis. i.e. both sensors are placed along the axis 700.

In FIG. 7C, the first magnetic field sensor 170 and the second magnetic field sensor 172 are placed at a front section of the robotic work tool 100, along respective parallel axes 700 and 702 which are transversal to a longitudinal center axis 700 of the robotic work tool's propulsion direction 720, wherein the second magnetic field sensor 172 is placed at a transversal offset 712 and a longitudinal offset 702 from the first magnetic field sensor 170.

The embodiments in FIGS. 7A-7C all have an advantage in that the sensors 170 and 172 are located far away from the battery 180 and wheel motors 150, thereby reducing the risk of signal interference.

The controller 530 may, for instance, be implemented using instructions that enable hardware functionality, for example, by using executable computer program instructions in a general-purpose or special-purpose processor that may be stored on a computer readable storage medium (disk, memory etc) 120 to be executed by such a processor. The controller 530 may be configured to read instructions from the memory 520 and execute these instructions to control the operation of the robotic work tool 100. The controller 530 may be implemented using any suitable, publically available processor or Programmable Logic Circuit (PLC). The memory 530 may be implemented using any commonly known technology for computer-readable memories such as ROM, RAM, SRAM, DRAM, CMOS, FLASH, DDR, SDRAM or some other memory technology.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool for use with a guiding wire, the guiding wire being configured to conduct electric current to generate a magnetic field around the guiding wire, the robotic work tool comprising:
   a sensing system configured to detect a strength of the magnetic field, the sensing system comprising a first magnetic field sensor and a second magnetic field sensor, the second magnetic field sensor being positioned at an offset with respect to the first magnetic field sensor;
   a steering system; and
   a controller configured to control said steering system in response to output from said sensing system by means of a feedback control loop so as to cause movement of said robotic work tool along said guiding wire, wherein the controller is configured to:
      determine a distance measure indicative of a distance between the robotic work tool and the guiding wire, wherein determining the distance measure comprises
         reading a first sensor signal value from the first magnetic field sensor,
         reading a second sensor signal value from the second magnetic field sensor,
         assessing the first sensor signal value and a relation between the first sensor signal value and the second sensor signal value, and
         determining a present distance value, in response to multiple possible present distance values, based on the relation between the first sensor signal value and the second sensor signal value; and
      adjust at least one parameter of the feedback control loop in response to the distance measure determined.

2. The robotic work tool according to claim 1, wherein the distance measure is determined as a particular distance range, in a set of distance ranges in which an estimated distance between the robotic work tool and the guiding wire falls.

3. The robotic work tool according to claim 2, further comprising a memory configured to store a set of predefined feedback control loop parameter values for respective distance ranges in said set of distance ranges, wherein the controller is configured to use the predefined feedback control loop parameter values for the determined particular distance range when adjusting the at least one parameter of the feedback control loop.

4. The robotic work tool according to claim 3, wherein:
   the feedback control loop is a PID control loop,
   the predefined feedback control loop parameter values represent possible values of the proportional gain, the integral gain and the derivative gain of said PID control loop for different distance ranges in said set of distance ranges, and
   the adjusted at least one parameter of the feedback control loop is at least one of the present proportional gain, the present integral gain and the present derivative gain of said PID control loop.

5. The robotic work tool according to claim 2, wherein the set of distance ranges includes:
   a first distance range representing estimated distances larger than a threshold distance at one side of the guiding wire; and
   a second distance range representing estimated distances closer than the threshold distance at said one side of the guiding wire.

6. The robotic work tool according to claim 5, wherein the guiding wire is a boundary wire, and said one side is the inside of an area demarcated by the boundary wire.

7. The robotic work tool according to claim 5, wherein the set of distance ranges further includes:

a first intermediate distance range representing estimated distances between the first and second distance ranges at said one side of the guiding wire.

8. The robotic work tool according to claim 7, wherein the second distance range is considerably narrower than the first distance range, and the first intermediate distance range is considerably narrower than the second distance range.

9. The robotic work tool according to claim 8, wherein the set of distance ranges further includes:
a third distance range representing estimated distances closer than the threshold distance at an opposite side of the guiding wire,
a fourth distance range representing estimated distances larger than a threshold distance at said opposite side of the guiding wire, and
a second intermediate distance range representing estimated distances between the third and fourth distance ranges at said opposite side of the guiding wire.

10. The robotic work tool according to claim 1, wherein determining a present distance value comprises:
estimating the present distance value by cross-referencing a predefined mapping between sensor signal value and distance using the first sensor signal value as index, and
in response to the multiple possible present distance values being found by the cross-referencing, using the relation between the first sensor signal value and the second sensor signal value to uniquely determine the present distance value.

11. The robotic work tool according to claim 5, wherein the controller is configured to:
generate a virtual sensor signal value as:
the first sensor signal value, when the determined present distance value is within the second distance range,
the first sensor signal value plus the absolute value of a difference between a top signal value of the first sensor signal and the first sensor signal value, when the determined present distance value is within the first distance range; and
use the virtual sensor signal value as process variable in the feedback control loop for controlling the steering system.

12. The robotic work tool according to claim 1, wherein the first magnetic field sensor and the second magnetic field sensor are placed at a front section of the robotic work tool, along an axis transversal to a longitudinal center axis of the robotic work tool's propulsion direction.

13. The robotic work tool according to claim 12, wherein the first magnetic field sensor is placed on the longitudinal center axis and the second magnetic field sensor is placed at a transversal offset from the longitudinal center axis.

14. The robotic work tool according to claim 1, wherein the first magnetic field sensor and the second magnetic field sensor are placed at a front section of the robotic work tool, along respective parallel axes which are transversal to a longitudinal center axis of the robotic work tool's propulsion direction, wherein the second magnetic field sensor is placed at a transversal offset and a longitudinal offset from the first magnetic field sensor.

15. The robotic work tool claim 1, wherein the robotic work tool is a robotic lawnmower.

16. A robotic work tool system, comprising a charging station, a guiding wire, a signal generator for generating and transmitting an electric signal through said guiding wire to generate a magnetic field around the guiding wire, and a robotic work tool, the robotic work tool comprising:
a sensing system configured to detect a strength of the magnetic field, the sensing system comprising a first magnetic field sensor and a second magnetic field sensor, the second magnetic field sensor being positioned at an offset with respect to the first magnetic field sensor;
a steering system; and
a controller configured to control said steering system in response to output from said sensing system by means of a feedback control loop so as to cause movement of said robotic work tool along said guiding wire, wherein the controller is configured to:
determine a distance measure indicative of a distance between the robotic work tool and the guiding wire, wherein determining the distance measure comprises
reading a first sensor signal value from the first magnetic field sensor,
reading a second sensor signal value from the second magnetic field sensor,
assessing the first sensor signal value and a relation between the first sensor signal value and the second sensor signal value, and
determining a present distance value, in response to multiple possible present distance values, based on the relation between the first sensor signal value and the second sensor signal value; and
adjust at least one parameter of the feedback control loop in response to the distance measure determined.

17. A method of controlling a robotic work tool to follow along a guiding wire, the guiding wire being configured to conduct electric current and generate a magnetic field around the guiding wire, the method comprising:
controlling a steering system of the robotic work tool by means of a feedback control loop based on a detected magnetic field strength;
determining a distance measure indicative of a distance between the robotic work tool and the guiding wire, wherein determining the distance measure comprises
reading a first sensor signal value from a first magnetic field sensor,
reading a second sensor signal value from a second magnetic field sensor,
assessing the first sensor signal value and a relation between the first sensor signal value and the second sensor signal value, and
determining a present distance value, in response to multiple possible present distance values, based on the relation between the first sensor signal value and the second sensor signal value; and
adjusting at least one parameter of the feedback control loop in response to the distance measure determined.

18. The robotic work tool system according to claim 16, wherein the distance measure is determined as a particular distance range, in a set of distance ranges in which an estimated distance between the robotic work tool and the guiding wire falls, and
wherein the robotic work tool further comprises a memory configured to store a set of predefined feedback control loop parameter values for respective distance ranges in said set of distance ranges, wherein the controller is configured to use the predefined feedback control loop parameter values for the determined particular distance range when adjusting the at least one parameter of the feedback control loop.

19. The robotic work tool system according to claim 18, wherein:
the feedback control loop is a PID control loop,
the predefined feedback control loop parameter values represent possible values of the proportional gain, the integral gain and the derivative gain of said PID control loop for different distance ranges in said set of distance ranges, and the adjusted at least one parameter of the feedback control loop is at least one of the present proportional gain, the present integral gain and the present derivative gain of said PID control loop.

20. The robotic work tool according to claim 1, wherein the second sensor signal value is obtained simultaneously with the first sensor signal value.

* * * * *